K. B. MARTIN.
POULTRY FOUNTAIN.
APPLICATION FILED FEB. 25, 1909.
948,928.
Patented Feb. 8, 1910.
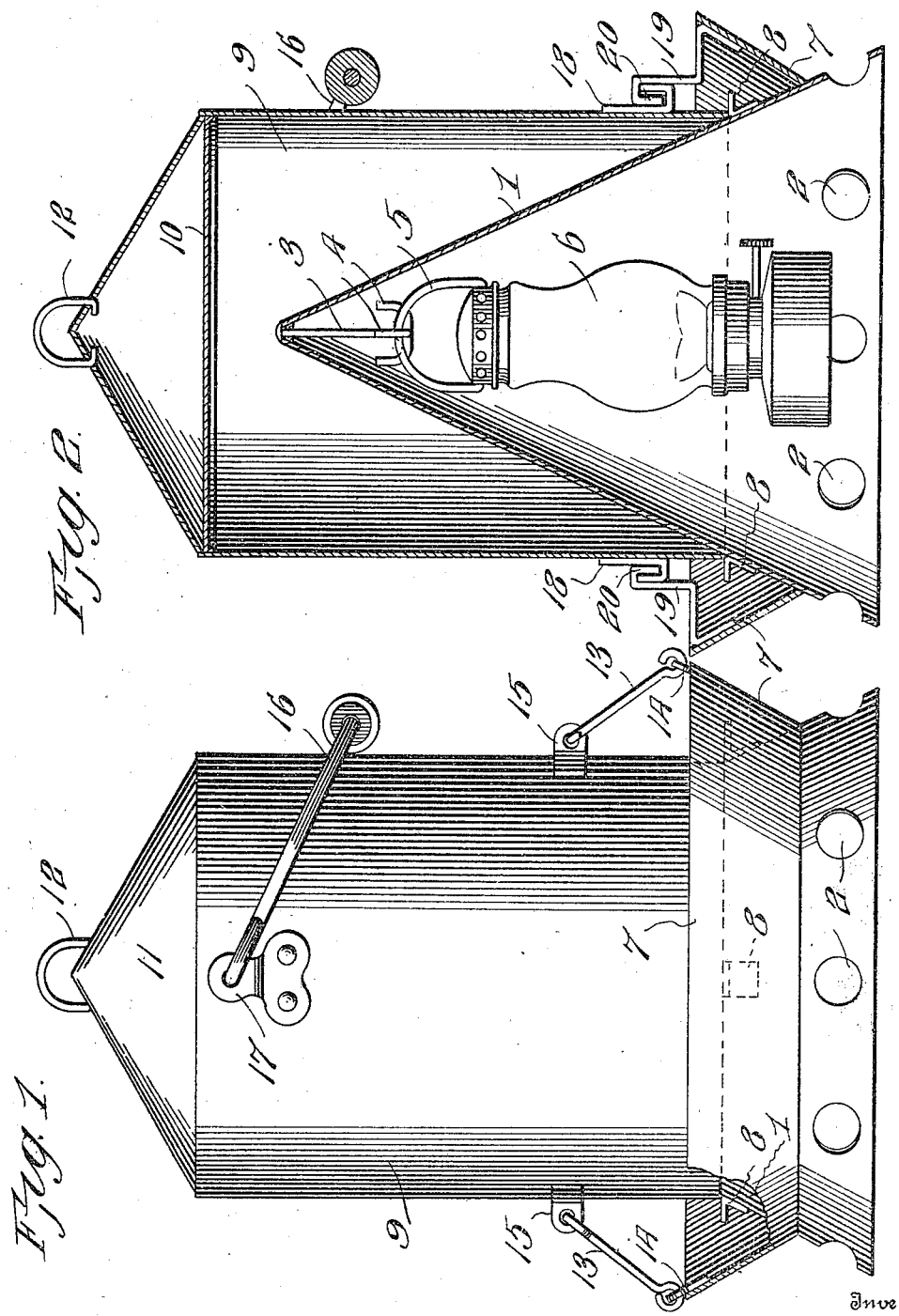
Witnesses
Frank Hough
E. R. Bunyea
Inventor
Kenneth B. Martin,
By Victor J. Evans
Attorney

UNITED STATES PATENT OFFICE.

KENNETH B. MARTIN, OF FAIR GROVE, MISSOURI.

POULTRY-FOUNTAIN.

948,928.  Specification of Letters Patent.  Patented Feb. 8, 1910.

Application filed February 25, 1909. Serial No. 479,898.

*To all whom it may concern:*

Be it known that I, KENNETH B. MARTIN, a citizen of the United States, residing at Fair Grove, in the county of Greene and State of Missouri, have invented new and useful Improvements in Poultry-Fountains, of which the following is a specification.

This invention relates to poultry fountains, and one of the principal objects of the same is to provide a self-feeding drinking fountain for poultry in which the water will be kept from freezing and in which the water in the drinking trough will be kept at the required temperature best adapted for drinking purposes.

Another object of the invention is to provide a simple drinking fountain for poultry which can be readily conveyed from place to place, which will not freeze up and in which the poultry is kept from alighting or standing upon the top of the fountain or reservoir.

These and other objects may be attained by means of the construction illustrated in the accompanying drawing, in which,—

Figure 1 is a side elevation of a poultry fountain made in accordance with my invention, a portion of the trough being broken away to better illustrate the construction. Fig. 2 is a vertical section through the reservoir, the heating chamber and the trough, modified means being shown for securing the reservoir to the trough and heating chamber.

Referring to the drawing, the numeral 1 designates a conical heating chamber, said chamber being preferably formed of a seamless metallic cone provided with air holes 2 near the base thereof and provided with a hook 3 secured to the apex of the cone and depending upon the inside thereof. The hook 3 is provided with a plurality of upwardly extending bills 4 for supporting the bail or handle 5 of a lantern 6.

Secured around the outer wall of the cone 1 is an outwardly flaring trough 7, said trough terminating at its lower edge above the air holes 2 in the heating chamber. Angular supporting stops 8 are secured to the outer wall of the conical heating chamber 1 to support the lower edge of the water reservoir. The water reservoir 9 is permanently closed at its upper end by means of the top 10, properly connected to the upper edge of the reservoir 9. A conical cover 11 is removably placed upon the top 10 and is provided with a handle 12. This cap or cover 11 is used to prevent the poultry from alighting or standing upon the top of the reservoir.

As shown in Fig. 1, a pair of hooks or latches 13 are connected at the opposite sides of the trough 8 by means of perforated lugs 14, said hooks or latches being removably connected to keepers 15 secured to the outer side of the reservoir 9. A suitable handle or bail 16 is pivoted to ears 17 for conveying the fountain from place to place.

As shown in Fig. 2, the latches or hooks 13 are dispensed with, and in their stead is used a pair of hooks 18 secured to the opposite sides of the reservoir 9. To engage the hooks 18 and to hold the reservoir in connection with the heating chamber and trough oppositely disposed hooks 19 are secured at their outer ends to the trough, said hooks having downwardly extending bills 20 to engage the hooks 18.

The operation of my invention may be briefly described as follows: For filling the reservoir 9 it is disconnected from the heating chamber and inverted. When the water has been placed in the reservoir 9 the cone 1 is inserted and the hooks are engaged to hold the two parts properly connected. In this condition the fountain is reversed, the water feeding down underneath the lower edge of the reservoir into the trough 7. The lantern 6 can be readily connected to one of the bills 4 of the hook 3 by pushing the lantern up into the cone.

From the foregoing it will be obvious that the water in the reservoir will be kept at the required temperature and prevented from freezing, and that the water in the trough will also be kept warm and prevented from freezing.

My invention is of simple construction; can be manufactured at low cost, is composed of few parts, and can be readily carried from place to place.

I claim:—

The herein described drinking fountain for poultry comprising a water reservoir, a conical heating chamber extending into the reservoir from the bottom thereof, means for detachably connecting the heating chamber to the reservoir, a trough connected to the heating chamber and extending around the bottom of the reservoir, and a hook extending from the apex inside the conical heater, said hook comprising a series of bills extending radially from the center thereof for supporting a lantern.

In testimony whereof I affix my signature in presence of two witnesses.

KENNETH B. MARTIN.

Witnesses:
JOHN L. FLETCHER,
E. P. BUNYEN.